United States Patent
Ananth et al.

(10) Patent No.: US 11,552,701 B2
(45) Date of Patent: Jan. 10, 2023

(54) HANDOVER COORDINATION FOR LARGE AREA COVERAGE

(71) Applicant: Aalyria Technologies, Inc., Livermore, CA (US)

(72) Inventors: Sharath Ananth, Cupertino, CA (US); Brian Barritt, San Jose, CA (US); Pavan Nuggehalli, San Carlos, CA (US)

(73) Assignee: Aalyria Technologies, Inc., Livermore, CA (US)

( * ) Notice: Subject to any disclaimer, the term of this patent is extended or adjusted under 35 U.S.C. 154(b) by 0 days.

(21) Appl. No.: 17/018,855

(22) Filed: Sep. 11, 2020

(65) Prior Publication Data
US 2021/0083763 A1 Mar. 18, 2021

Related U.S. Application Data

(60) Provisional application No. 63/052,113, filed on Jul. 15, 2020, provisional application No. 62/979,544, (Continued)

(51) Int. Cl.
| | |
|---|---|
| *H04B 7/185* | (2006.01) |
| *H04W 76/11* | (2018.01) |
| *H04W 72/12* | (2009.01) |

(52) U.S. Cl.
CPC ..... *H04B 7/18541* (2013.01); *H04B 7/18532* (2013.01); *H04W 72/1263* (2013.01); *H04W 76/11* (2018.02)

(58) Field of Classification Search
CPC ......... H04W 72/1263; H04W 72/1205; H04W 72/1278; H04W 76/11; H04W 76/10;
(Continued)

(56) References Cited

U.S. PATENT DOCUMENTS

| | | | | |
|---|---|---|---|---|
| 2014/0192781 A1* | 7/2014 | Teyeb | ............ | H04W 36/36 370/331 |
| 2014/0198637 A1* | 7/2014 | Shan | ............ | H04L 47/12 370/229 |

(Continued)

FOREIGN PATENT DOCUMENTS

WO 2019016386 A1 1/2019

OTHER PUBLICATIONS

'3GPP; TSG RAN; Solutions for NR to support non-terrestrial networks (NTN) (Release16)', 3GPP TR 38.821 V0.7.0, Jun. 13, 2019.

(Continued)

*Primary Examiner* — Phong La
(74) *Attorney, Agent, or Firm* — Platinum Intellectual Property LLP

(57) ABSTRACT

A method for performing a handover operation includes using one or more processors of a non-terrestrial node to initiate communication with a first terrestrial node of a network, the terrestrial node having a first unique node identifier and a cell identifier and store a mapping that associates the first unique node identifier with the cell identifier. The method also includes using the one or more processors to receive an indicator that the mapping is subject to change and update the mapping to associate a second unique node identifier of a second terrestrial node of the network with the cell identifier based on the received indicator.

20 Claims, 6 Drawing Sheets

Related U.S. Application Data filed on Feb. 21, 2020, provisional application No. 62/900,090, filed on Sep. 13, 2019.

(58) Field of Classification Search
CPC ..... H04W 76/15; H04W 76/18; H04W 76/19; H04B 7/18532; H04B 7/18526; H04B 7/18539; H04B 7/18541; H04B 7/18547
USPC ........................................................ 370/316
See application file for complete search history.

(56) References Cited

U.S. PATENT DOCUMENTS

| | | | | |
|---|---|---|---|---|
| 2014/0274029 | A1* | 9/2014 | Radulescu | H04W 24/04 455/424 |
| 2016/0135132 | A1* | 5/2016 | Donepudi | H04W 52/245 370/311 |
| 2016/0150453 | A1* | 5/2016 | Narayanan | H04W 36/0061 455/436 |
| 2016/0174282 | A1* | 6/2016 | Grant | H04W 36/0079 455/422.1 |
| 2017/0366679 | A1* | 12/2017 | Mohamed | H04M 15/66 |
| 2019/0313280 | A1* | 10/2019 | Gottwerth | H04L 63/029 |
| 2019/0380087 | A1* | 12/2019 | Park | H04W 48/20 |
| 2020/0288390 | A1* | 9/2020 | Wang | H04W 48/20 |
| 2020/0314906 | A1* | 10/2020 | Goyal | H04B 7/0695 |
| 2021/0068026 | A1* | 3/2021 | Wang | H04W 36/0083 |
| 2021/0120481 | A1* | 4/2021 | Cheng | H04W 24/02 |
| 2021/0218466 | A1* | 7/2021 | Ökvist | H04W 36/32 |
| 2022/0038917 | A1* | 2/2022 | Suzuki | H04W 16/32 |

OTHER PUBLICATIONS

Ericsson et al. 'Feeder link switch for transparent and regenerative LEO', R2-1905301, 3GPP TSG-RAN WG2 #105b, Apr. 12, 2019 Xian, China.

Ericsson, 'Further detail on Earth fixed tracking area for LEO NTN', R2-1910542, 3GPP TSG-RAN WG2 Meeting #107, Aug. 15, 2019, Prague, Czech Republic.

International Search Report and Written Opinion for Application No. PCT/US20/50215 dated Dec. 8, 2020.

Nokia et al. 'Discussion on feeder link switch for regenerative & transparent NTN LEO scenarios', R2-1910698, 3GPP TSG-RAN WG2 Meeting #107, Aug. 16, 2019, Prague, Czech Republic.

* cited by examiner

Network 200

HANDOVER COORDINATION FOR LARGE AREA COVERAGE

CROSS REFERENCE TO RELATED APPLICATIONS

The present application claims the benefit of U.S. Patent Application No. 62/900,090, filed Sep. 13, 2019, U.S. Patent Application No. 62/979,544, filed Feb. 21, 2020, and U.S. Patent Application No. 63/052,113, filed Jul. 15, 2020, the entire disclosures of which are incorporated by reference herein.

BACKGROUND

Information can be transmitted over directional point-to-point networks or point-to-multipoint networks, such as aerospace and other mobile networks. In such networks, links can be formed between pairs of nodes by aiming transceivers of each node pair towards each other. Links can also be formed by steering the transceivers of a network node either toward a discrete user terminal or node or toward some discrete point to cover a general geographic area. In some implementations, nodes may include non-geostationary satellite orbit (NGSO) satellites or other high-altitude platforms (HAPs) that are in motion relative to the Earth.

BRIEF SUMMARY

The technology described herein provides for methods, systems, or mediums for implementing 5G NR using non-terrestrial nodes, such as high-altitude platforms. The methods, systems, or mediums allow for 5G-enabled nodes to coexist with other nodes providing other types of coverage. In addition, the methods and systems allow for networks to utilize resources made available through 5G NR, as well as other types of coverage.

Aspects of the disclosure provide for a method for performing a handover operation. The method includes initiating, by one or more processors of a non-terrestrial node, communication with a first terrestrial node of a network, the first terrestrial node having a first unique node identifier and a cell identifier; storing, by the one or more processors, a mapping that associates the first unique node identifier with the cell identifier; receiving, by the one or more processors, an indicator that the mapping is subject to change; and based on the received indicator, the one or more processors updating the mapping to associate a second unique node identifier of a second terrestrial node of the network with the cell identifier.

In one example, the first unique node identifier is a first E-UTRAN cell global identifier (ECGI); the second unique node identifier is a second ECGI; and the cell identifier is a physical cell identifier (PCI). In another example, the mapping is stored at a local memory of the non-terrestrial node. In a further example, the receiving of the indicator is based on the non-terrestrial node being in motion relative to the first terrestrial node. In yet another example, the indicator is a flag associated with the first unique node identifier. In a still further example, the indicator is a flag associated with the cell identifier.

In another example, the updating of the mapping occurs after the one or more processors initiates communication with the second terrestrial node of the network. In a further example, the updating of the mapping includes checking a unique node identifier of a node with which the one or more processors are communicating at regular intervals.

Other aspects of the disclosure provide for a system of a non-terrestrial node that includes one or more processors. The one or more processors are configured to initiate communication with a first terrestrial node of a network, the terrestrial node having a first unique node identifier and a cell identifier; store a mapping that associates the first unique node identifier with the cell identifier; receive an indicator that the mapping is subject to change; and based on the received indicator, update the mapping to associate a second unique node identifier of a second terrestrial node of the network with the cell identifier.

In one example, the first unique node identifier is a first E-UTRAN cell global identifier (ECGI); the second unique node identifier is a second ECGI; and the cell identifier is a physical cell identifier (PCI). In another example, the mapping is stored at a local memory of the non-terrestrial node. In a further example, the indicator is received based on the non-terrestrial node being in motion relative to the first terrestrial node. In yet another example, the indicator is a flag associated with the first unique node identifier. In a still further example, the indicator is a flag associated with the cell identifier.

In another example, the mapping is updated according to a communication with the second terrestrial node of the network. In a further example, the mapping updated based on a check of a unique node identifier of a node with which the one or more processors are communicating performed at regular intervals.

Further aspects of the disclosure provide for a non-transitory, computer-readable medium including instructions that, when executed by one or more processors of a non-terrestrial node of a network, cause the one or more processors to perform a method. The method includes initiating communication with a first terrestrial node of a network, the terrestrial node having a first unique node identifier and a cell identifier; storing a mapping that associates the first unique node identifier with the cell identifier; receiving an indicator that the mapping is subject to change; and based on the received indicator, updating the mapping to associate a second unique node identifier of a second terrestrial node of the network with the cell identifier.

In one example, the first unique node identifier is a first E-UTRAN cell global identifier (ECGI); the second unique node identifier is a second ECGI; and the cell identifier is a physical cell identifier (PCI). In another example, the indicator is a flag associated with the first unique node identifier. In a further example, the indicator is a flag associated with the cell identifier.

DETAILED DESCRIPTION

Overview

Figure 1:
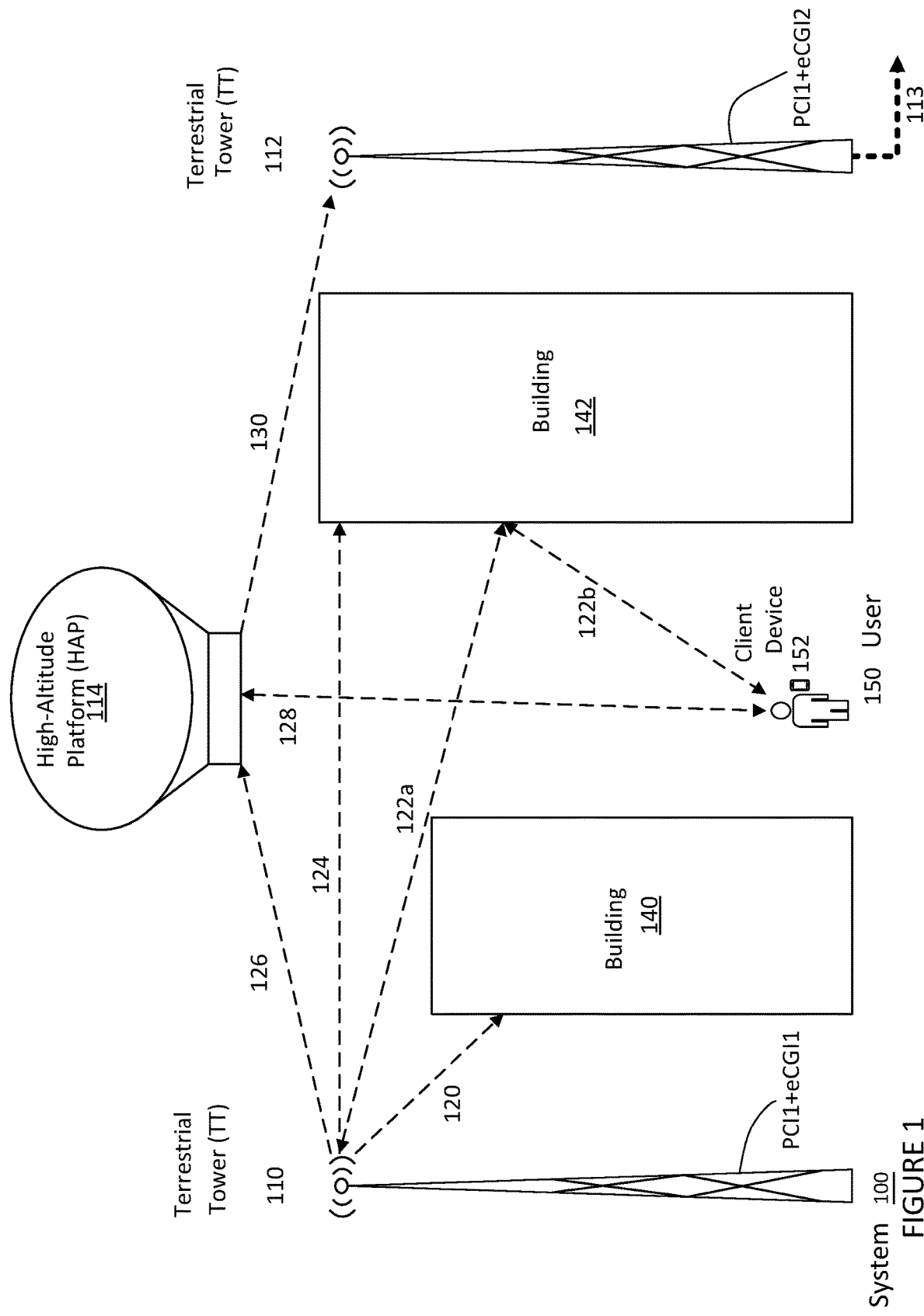
FIG. 1 is a pictorial diagram of a portion of an example network in accordance with aspects of the disclosure.

The technology relates to implementing 5G NR using non-terrestrial nodes, such as high-altitude platforms. In particular, the 5G-enabled non-terrestrial nodes may be required to coexist with other nodes providing other types of coverage, such as 4G LTE. In areas where there is 5G coverage as well as another type of network coverage is available, there is a need to coordinate between the different types of signals to provide coverage to user equipment (UE) in these areas. There are also new opportunities made available by the presence of multiple types of signals that may be taken advantage of in order to increase coverage or capacity of the overall network. In particular, performing handovers between a first node and a second node may include a protocol for updating or disassociating a physical cell identifier of a first node prior to connecting with the second node, which may have the same identifier.

The handover protocol may include a step to update an association of a given physical cell identifier (PCI) or other identifier information to switch from a first node to a second node. Each of a first node of the network and a second node of the network may each have a unique node identifier, such as an E-UTRAN cell global identifier (ECGI), and a cell identifier, such as physical cell identifier (PCI). For terrestrial nodes, the unique node identifier may include a location identifier. In some situations, the PCI for the first node and the second node may be the same. This is possible especially for terrestrial nodes when there is no overlap of coverage between the first node and the second node, and therefore less likelihood of confusion for UE or other nodes regarding with which node communication is occurring. In some implementations, the cell identifier is mapped to the unique node identifier for each terrestrial node, and this mapping may further be stored at a third node. Handovers of UE between the first node and the second node may then be coordinated by the third node.

However, in some scenarios, a given node of the network may have a large coverage area that includes both the first node and the second node or includes at least portions of each of the cells corresponding to the first node and the second node. These scenarios may be likely when implementing a non-terrestrial node, such as a high-altitude balloon, that has a coverage area on the order of tens of kilometers in width. In the coverage area may be a plurality of terrestrial nodes of the network. In other scenarios, a given node of the network may be in motion relative to the first node and the second node. The given node of the network in these scenarios may be in range of the first node at a first point in time and then become in range of the second node at a second point in time after the first point in time. The given node may be a non-terrestrial node that goes from being in range of a first terrestrial node to being in range of a second terrestrial node as the given node moves across a geographic area. In both of these scenarios, an existing mapping of the unique node identifier of the first node with the cell identifier stored at the given node may prevent a new mapping of the unique node identifier of the second node with the cell identifier. The handover protocol for networks comprising terrestrial and non-terrestrial nodes may therefore require transmitting an indicator for when a mapping of a unique node identifier of a node to a cell identifier is subject to change. The indicator may be a bit or flag associated with a cell identifier that is associated with multiple cells in a geographic area. When the indicator is associated with a given mapping, a node of the network may update the given mapping continually, periodically, or when a change is detected. The update may be performed by receiving a communication from a given node of the network including a unique identifier and a cell identifier for the given node.

The features disclosed herein may allow for a more seamless integration of 5G-enabled non-terrestrial nodes with existing terrestrial nodes that provide another type of coverage, such as 4G LTE. The 5G-enabled non-terrestrial nodes may then be used to supplement, expand, or strengthen the coverage of existing networks. For example, the service reliability of a network may be reinforced for M2M or IoT devices or for passengers onboard moving platforms. Multicast and broadcast resources for data may also be provided using the 5G-enabled non-terrestrial nodes, especially towards the network edges or at user terminals. In addition, non-terrestrial nodes, such as high-altitude balloons, may be used to expand network coverage into areas having little to no infrastructure for terrestrial networks. The use of non-terrestrial nodes may reduce the time and cost required to plan and install additional terrestrial nodes, especially in more remote areas.

Example Systems and Network

FIG. 1 is a pictorial diagram of an example system 100 of network nodes in a network. The network may include nodes mounted on various land-based and air-based devices, some of which may change position with respect to other nodes in the network over time. For example, as shown in FIG. 1, the network includes, as nodes, a first terrestrial tower (TT) 110 and a second TT 112. The network also includes as a node a high-altitude platform (HAP) 114. As shown, HAP 114 is a balloon. In other embodiments, the HAP may be a blimp, an airplane, an unmanned aerial vehicle (UAV) such as a drone, a satellite, or another platform capable of low Earth orbit.

Each node of the network may have a unique node identifier and a cell identifier. The unique node identifier may be an ECGI, and for terrestrial nodes, the unique node identifier may include a location identifier. The cell identifier may be a PCI, and in some situations, the PCI for the first node and the second node may be the same. For example, as terrestrial towers 110, 112 do not have overlapping coverage areas, terrestrial towers 110, 112 may have the same PCI. As shown in FIG. 1, terrestrial tower 110 cell identifier PCI1 and unique node identifier eCGI1, and terrestrial tower 112 has a same cell identifier PCI1 and a different unique node identifier eCGI2. The unique node identifier and the cell identifier for each node may be stored locally at one or more nodes of the network, at a central server at a particular node of the network, or at another remote location accessible by one or more nodes of the network.

Nodes in the network may be equipped to transmit and receive mmWave signals or other very high frequency signals. Additionally or alternatively, nodes in the network may be equipped to transmit and receive other radio-frequency signals, optical signals, or other communication signal capable of travelling through free space. Arrows shown projecting from nodes represent possible paths 120, 122a, 122b, 124, 126, 128, 130 for a transmitted communication signal. As shown in FIG. 1, some possible paths may be blocked by buildings, such as buildings 140, 142. For example, a signal following path 120 from terrestrial tower 110 may be angled below the horizon and be blocked by building 140. A signal following path 122a from terrestrial tower 110 may be angled above path 120, avoiding building 140, but then may contact building 142. The signal following path 122a may reflect off building 142 and follow path 122b towards the ground location of a user 150, carrying a client device 152. A signal following path 124 from terrestrial tower 110 may be angled towards or above the horizon, nearly parallel to the ground, passing over building 140, but then may be blocked by building 142. A signal following path 126 from terrestrial tower 110 may be angled above the horizon and reach HAP 114. A signal following path 128 from HAP 114 directed to the ground location of user 150. A signal following path 130 from HAP 114 may be angled below the horizon, pass over building 142, and reach terrestrial tower 112.

Also shown in FIG. 1, a signal may be transmitted from the client device 152 of the user 150 back towards one or more nodes of the network. For example, a signal from the client device 152 may be transmitted back along paths 122b and 122a towards terrestrial tower 110. Another signal from the client device 152 may be transmitted back along path 128 towards HAP 114. In addition, multiple users or multiple client devices may form bi-directional access links with a given node of the network at a given point in time, in addition to the user 150 and the client device 152 shown in FIG. 1.

The network nodes as shown in FIG. 1 is illustrative only, and the network may include additional or different nodes. For example, in some implementations, the network may include additional HAPs and/or additional terrestrial towers. When the network includes at least one low Earth orbit or high Earth orbit satellite as well as one other type of HAP, the network may be defined as a hybrid HAP/satellite network.

Figure 2:
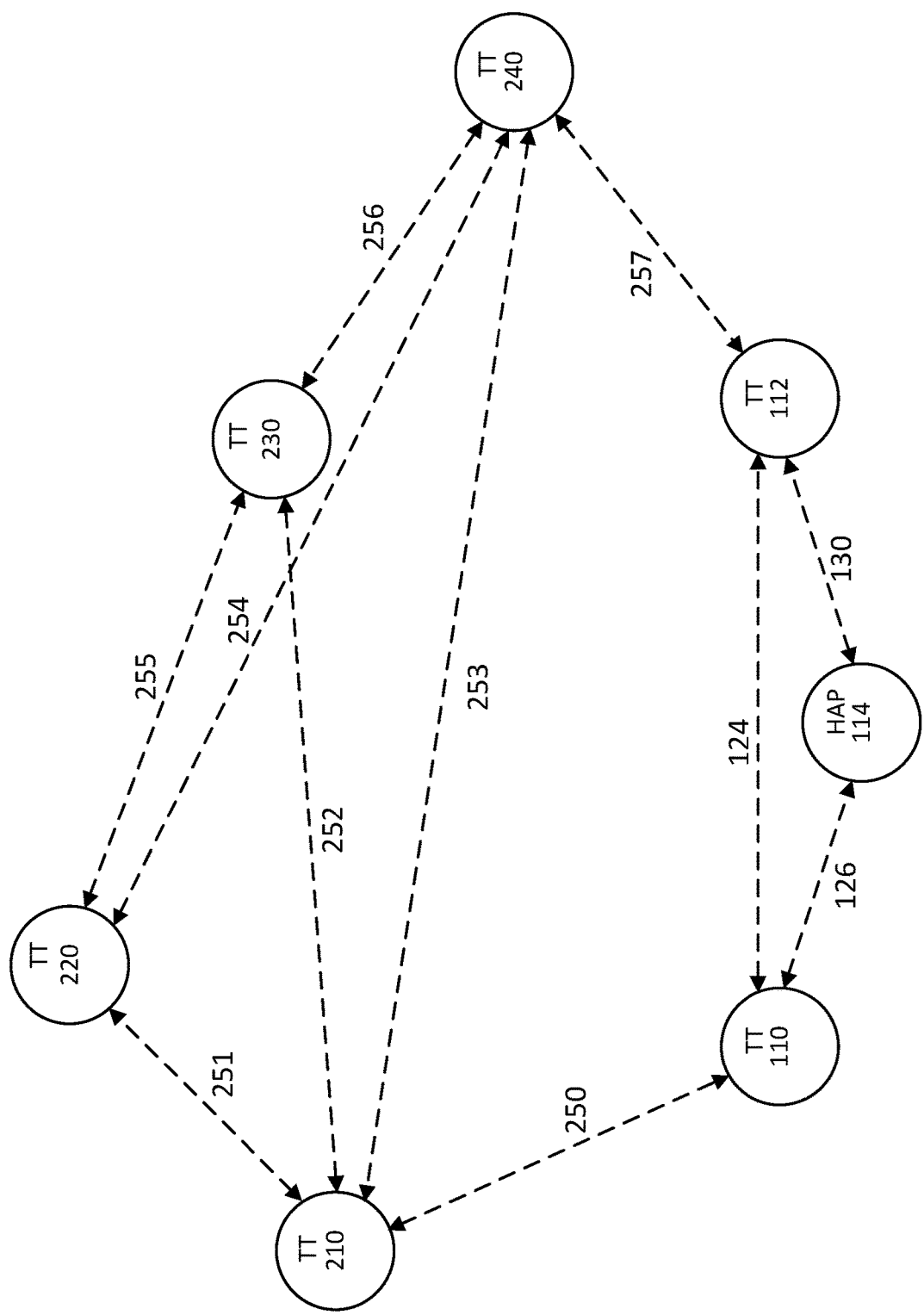
FIG. 2 is a diagram of an example network in accordance with aspects of the disclosure.

For example, as shown in FIG. 2, the network 200 that includes the system 100 may also include as nodes additional terrestrial towers 210, 220, 230, and 240. Arrows shown between a pair of nodes represent possible communication paths between the nodes. In addition to paths 124, 126, and 130 corresponding to the paths shown in FIG. 1, paths 250-257 are shown between the nodes. The network 200 as shown in FIG. 2 is illustrative only, and in some implementations the network 200 may include additional or different nodes. The status information received from the nodes of the network may include the location information of HAP 114 or weather conditions at locations of terrestrial towers 110, 112, 210, 220, 230, and 240 at a current time or a future time. The location information of HAP 114 may include a projected trajectory or set location, such as a future location at the future time that is in signal range of the terrestrial towers 110, 112.

In some implementations, the network may serve as an access network for client devices such as cellular phones, laptop computers, desktop computers, wearable devices, or tablet computers. For example, nodes 110, 112, 114 may connect to the datacenters via wireless, fiber, or cable backbone network links or transit networks operated by third parties. The nodes 110, 112, 114 may provide wireless access for the users, and may forward user requests to the datacenters and return responses to the users via the backbone network links.

In particular, the first terrestrial tower 110, the second terrestrial tower 112, and the HAP 114 may include wireless transceivers configured to operate in a cellular or other mobile network, such as 5G NR (new radio) networks or LTE networks. The nodes 110, 112, 114 may operate as gNodeB stations, eNodeB stations, or other wireless access points, such as WiMAX or UMTS access points. One or more terrestrial towers in the network may include an optical fiber or other link connecting the one or more terrestrial towers to another terrestrial tower or datacenter. For example, the second terrestrial tower 112 may include fiber 113, shown by a dotted arrow, that connects to another terrestrial tower (not shown). As shown in FIG. 1, user 150 carrying a client device 152 may be configured to communicate with one or more of the nodes in the network. The network also may be connected to a larger network, such as the Internet, and may be configured to provide a client device with access to resources stored on or provided through the larger computer network.

Figure 3:
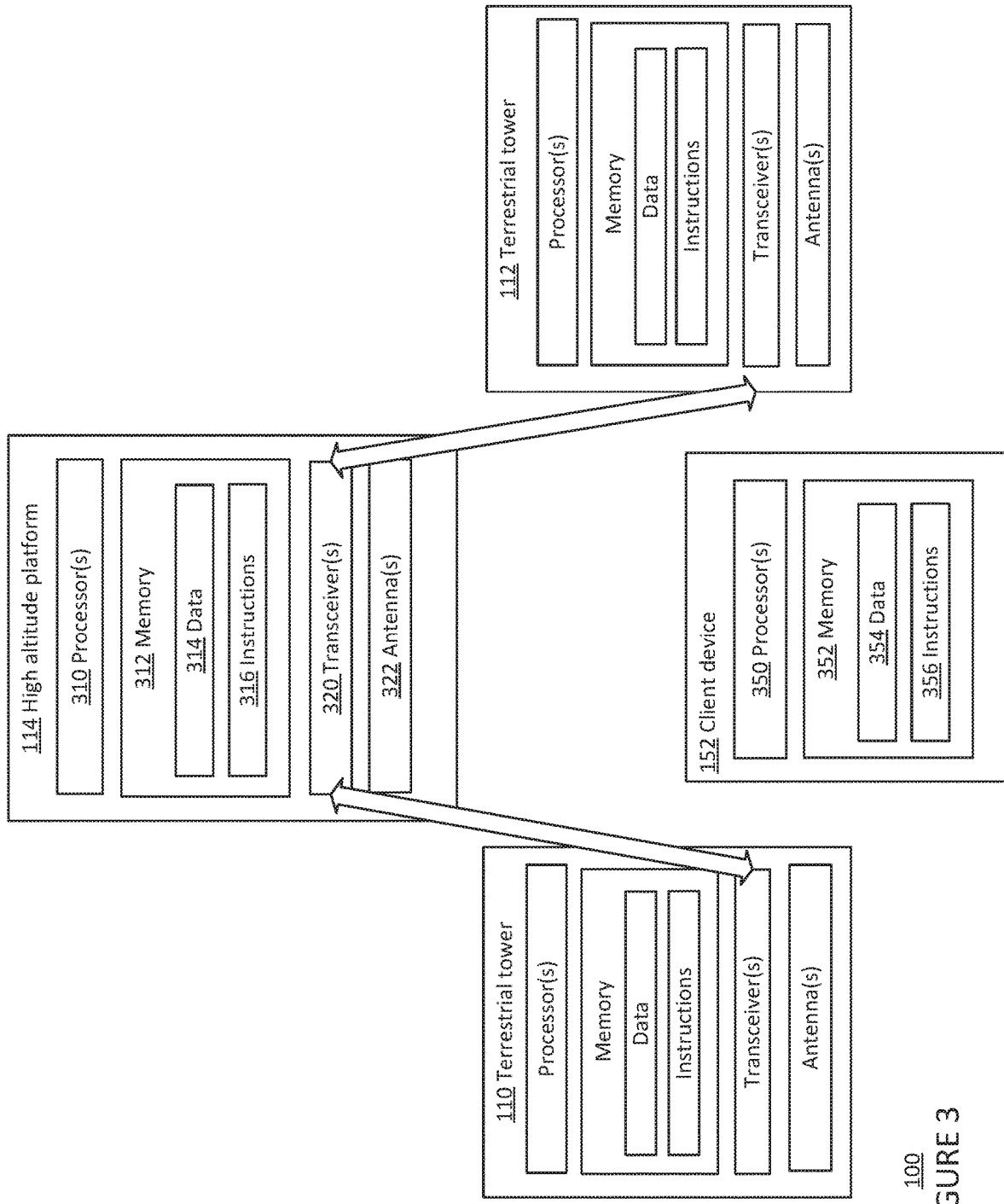
FIG. 3 is a functional diagram of the portion of the network shown in FIG. 1 in accordance with aspects of the disclosure.

As shown in FIG. 3, each node, such as first terrestrial tower 110, second terrestrial tower 112, and HAP 114, may include one or more transceivers configured to transmit and receive communication signals and create one or more communication links with another node in the network. Referring to HAP 114 as an example, each of the nodes, may include one or more processors 310, memory 312, one or more transceivers 320, and one or more antenna 322. While only terrestrial towers 110, 112 and HAP 114 are shown, other terrestrial towers and HAPs in the network may have the same or as similar configurations.

The one or more processors 310 may be any conventional processors, such as commercially available CPUs. Alternatively, the one or more processors may be a dedicated device such as an application specific integrated circuit (ASIC) or other hardware-based processor, such as a field programmable gate array (FPGA). The one or more processors 310 may be configured to operate according to a given protocol architecture for a mobile network, such as 5G NR architecture or LTE radio protocol architecture. Although FIG. 3 functionally illustrates the one or more processors 310 and memory 312 as being within the same block, it will be understood that the one or more processors 310 and memory 312 may actually comprise multiple processors and memories that may or may not be stored within the same physical housing. Accordingly, references to a processor or computer will be understood to include references to a collection of processors or computers or memories that may or may not operate in parallel.

Memory 312 stores information accessible by the one or more processors 310, including data 314, and instructions 316, that may be executed by the one or more processors 310. The memory may be of any type capable of storing information accessible by the processor, including non-transitory and tangible computer-readable mediums containing computer readable instructions such as a hard-drive, memory card, ROM, RAM, DVD or other optical disks, as well as other write-capable and read-only memories. The system and method may include different combinations of the foregoing, whereby different portions of the data 314 and instructions 316 are stored on different types of media.

In the memory of each node, such as memory 312 of HAP 114, a forwarding information base or forwarding table may be stored that indicate how signals received at each node should be forwarded, or transmitted. For example, the forwarding table stored in memory 312 may indicate that a signal received from terrestrial tower 110 should be forwarded to terrestrial tower 112. In addition, the memory 312 may include a database of mappings of cell identifiers to unique node identifiers of given nodes of the networks. The database may also include one or more indicators for one or more mappings. The one or more indicators may provide information about the mapping with which it is associated, as further described below.

Data 314 may be retrieved, stored or modified by the one or more processors 310 in accordance with the instructions 316. For instance, although the system and method are not limited by any particular data structure, the data 314 may be stored in computer registers, in a relational database as a table having a plurality of different fields and records, XML documents or flat files. The data 314 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 314 may comprise any information sufficient to identify the relevant information, such as numbers, descriptive text, proprietary codes, references to data stored in other areas of the same memory or different memories (including other network locations) or information that is used by a function to calculate the relevant data.

The instructions 316 may be any set of instructions to be executed directly (such as machine code) or indirectly (such as scripts) by the one or more processors 310. For example, the instructions 316 may include the given protocol architecture for the mobile network of which the node is a part. The given protocol architecture may include a split architecture between a central unit and a distributed unit. In addition, the given protocol architecture may define a control plane, a user plane, or other protocol layers. The given protocol architecture may also include an interface that defines a plurality of messages for use in communication between the protocol layers. The instructions 316 may be stored as computer code on the computer-readable medium. In that regard, the terms "instructions" and "programs" may be used interchangeably herein. The instructions 316 may be stored in object code format for direct processing by the one or more processors 310, or in any other computer language including scripts or collections of independent source code modules that are interpreted on demand or compiled in advance. Functions, methods and routines of the instructions 316 are explained in more detail below.

The one or more transceivers 320 may include at least one wireless transceiver mounted to actuators that can be controlled, or steered, to point in a desired direction. To form a wireless link between two nodes, such as the node associated with the HAP 114 and the node associated with the first terrestrial tower 110, the wireless transceivers of the respective nodes can be controlled to point in the direction of one another so that data can be sent and received between the nodes. For nodes with fiber or cable connections, such as second terrestrial tower 112, the one or more transceivers 320 may also include at least one transceiver configured to communicate via a fiber or cable connection.

As further shown in FIG. 3, the client device 152 associated with user 150 may be a personal computing device or a server with one or more processors 350, memory 352, data 354, and instructions 356 similar to those described above with respect to the one or more processors 310, memory 312, data 314, and instructions 316. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a television, a projector, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client device 152 may be any device capable of processing instructions and transmitting data to and from humans and other computers including general purpose computers, network computers lacking local storage capability, and set-top boxes for televisions. In some embodiments, client devices may be associated with one or more self-defined network (SDN) applications and may have one or more northbound interface (NBI) drivers.

Figure 4:
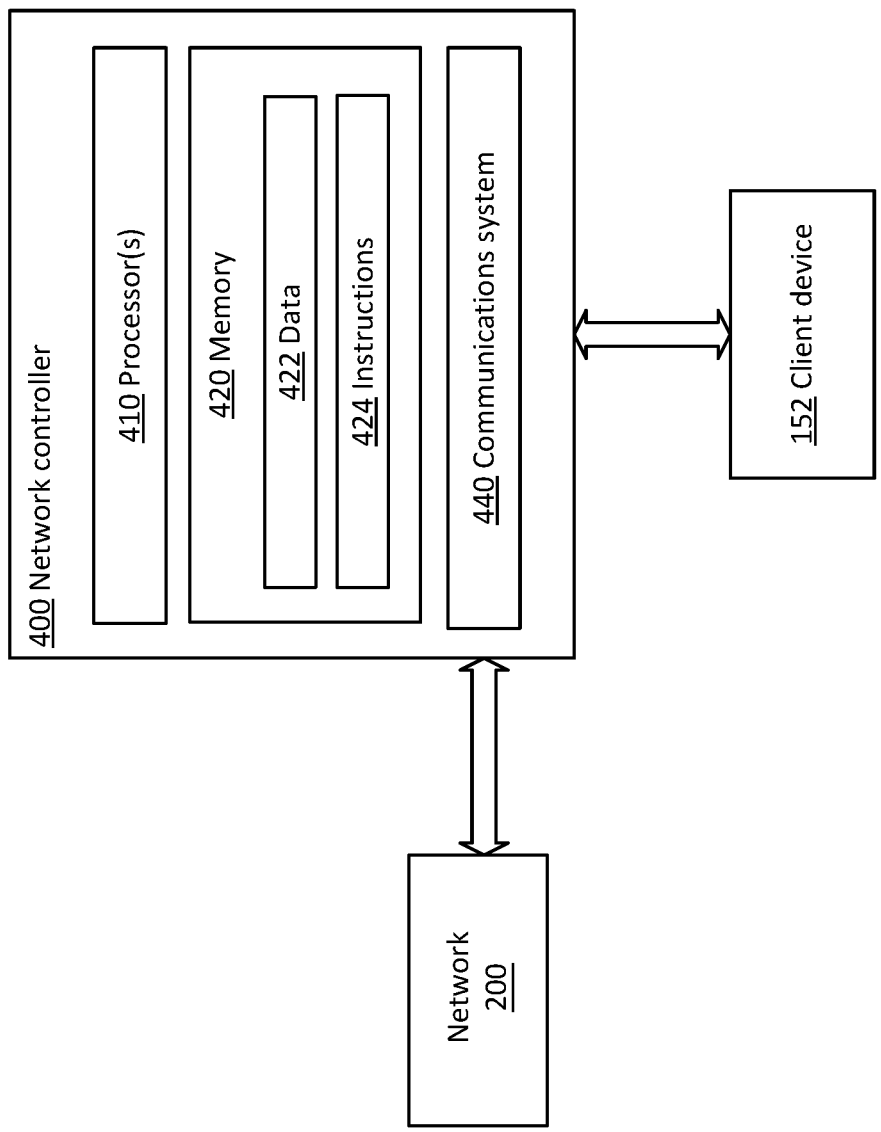
FIG. 4 is a functional diagram of a network controller in accordance with aspects of the disclosure.

In some implementations, the network 200 can be an SDN that is controlled by an SDN controller, such as network controller 400 depicted in FIG. 4. The network controller 400 may be located at one of the network nodes or at a separate platform, such as, for example, in a datacenter. The nodes of the network 200, including nodes 110, 112, 114, may be configured to communicate with one another using the steerable transceivers, such as the one or more transceivers 320. As the HAPs in the network, such as HAP 114, move with respect to other nodes in the network 200, such as terrestrial towers 110, 112, some network links may become infeasible due to range of the transceivers or obstacles between the nodes. Thus, the configuration of the network 200 may require regular (i.e., periodic) or irregular reconfiguration using the network controller 400 to maintain connectivity and to satisfy determined network flows.

FIG. 4 is a block diagram of network controller 400. The network controller 400 may be configured to send control messages to the nodes of the network 200 to provide reconfiguration according to updated topology, to pass routing information, and to schedule reconfigurations to transmit client data. As shown in FIG. 4, the network controller 400 may include one or more processors 410, memory, 420, and communications system 440. The one or more processors 410 may be similar to the one or more processors 310 described above. Memory 420 may store information accessible by the one or more processors 410, including data 422 and instructions 424 that may be executed by processor 410. Memory 420, data 422, and instructions 424 may be configured similarly to memory 312, data 314, and instructions 316 described above. The data 422 may include a table representing all of the available nodes and possible links in the network 200 at a given time or time frame. The instructions 424 may include one or more modules for managing topology and routing, determining topology, determining network flows, solving for network configurations, controlling flight of a given HAP, or scheduling future network configurations.

The communications system 440 may be configured to communicate with the nodes of network, such as nodes 110, 112, 114, as well as one or more client devices, such as client device 152. In some embodiments, the communication system 440 includes a Control to Data-Plane Interface (CDPI) driver configured to communicate with a CDPI agent at each of the nodes 110, 112, 114. In addition, the communications system 440 of the network controller 400 may include one or more NBI agents configured to communicate with an NBI driver at each client device associated with one or more SDN applications. The communication system 440 may optionally or alternatively be configured to transmit and receive a signal via radio frequencies, optical frequencies, optical fiber, cable, or other communication means to and from the nodes in the network and the one or more client devices.

Example Implementations and Methods

In addition to the operations described above and illustrated in the figures, various implementations and methods will now be described. It should be understood that the described operations and steps do not have to be performed in the precise order provided below. Rather, various operations and steps can be handled in a different order or simultaneously, and operations and steps may also be added or omitted.

Figure 5:
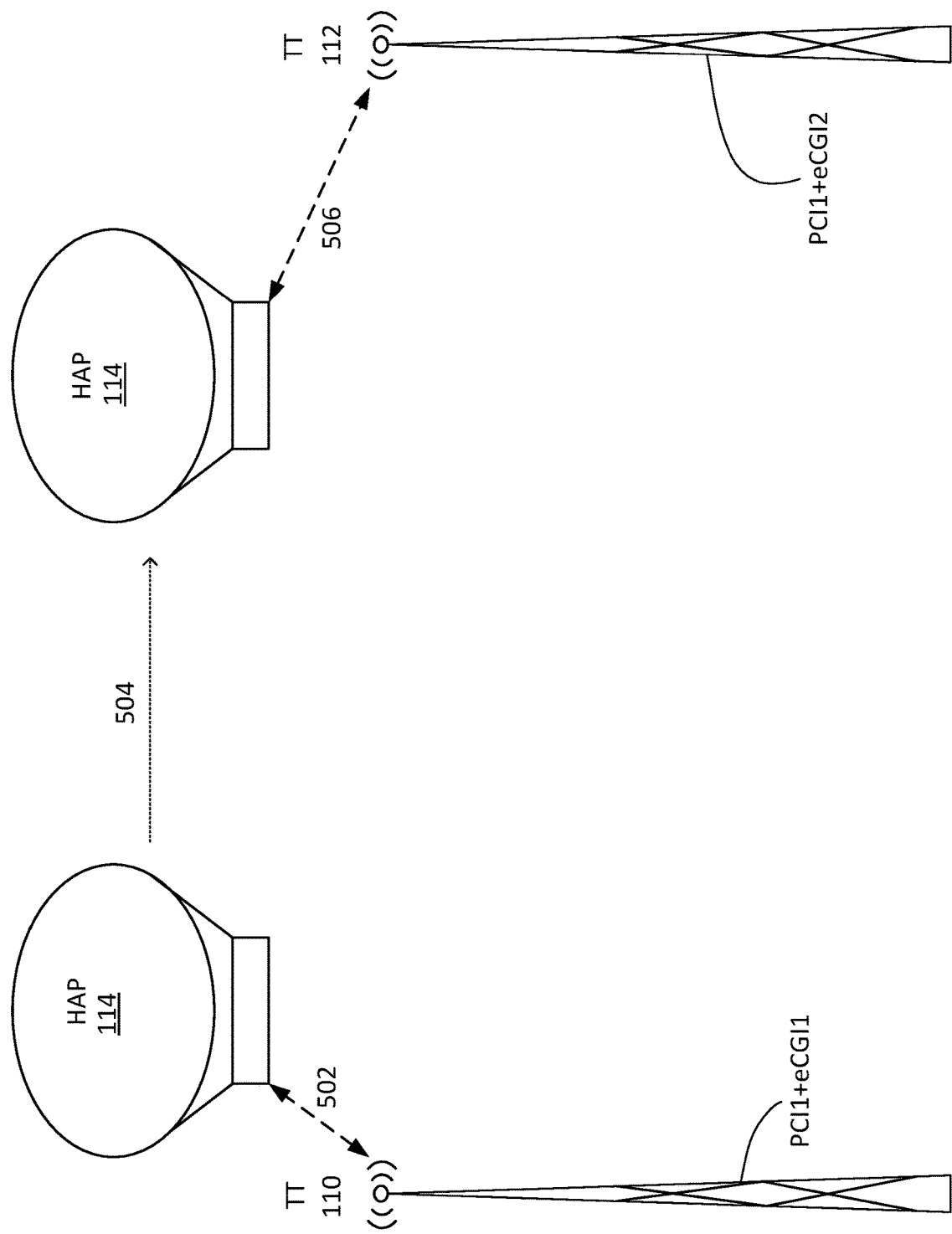
FIG. 5 is a pictorial diagram of a scenario in the network in accordance with aspects of the disclosure.

A given node of the network may be in motion relative to two nodes that have a same cell identifier. The given node of the network may be in range of a first node at a first point in time and then become in range of a second node at a second point in time after the first point in time. The given node may be a non-terrestrial node that goes from being in range of a first terrestrial node to being in range of a second terrestrial node as the given node moves across a geographic area. As shown in FIG. 5, the HAP 114 may be in motion relative to terrestrial tower 110 and terrestrial tower 112. At a first point in time, the HAP 114 may be closer to the terrestrial tower 110 than the terrestrial tower 112 and may communicate with terrestrial tower 110 via link 502. After the first point in time, the HAP 114 may travel away from terrestrial tower 110 and towards terrestrial tower 112, as shown by arrow 504. At the second point in time after the first point in time, the HAP 114 may be closer to the terrestrial tower 112 than the terrestrial tower 110 and may communicate with terrestrial tower 112 via link 506. Alternatively, the given node may be a terrestrial node that goes from being in range of a first non-terrestrial node to being in range of a second non-terrestrial node as the first non-terrestrial node moves away from the terrestrial node and the second non-terrestrial node moves towards the terrestrial node.

The handover protocol for networks comprising terrestrial and non-terrestrial nodes may include transmitting an indicator for when a mapping of a unique node identifier of a node to a cell identifier is subject to change. The indicator may be a bit or flag associated with a cell identifier that is associated with multiple cells in a geographic area. The indicator may be transmitted when a cell identifier associated with multiple cells in a geographic area is transmitted. For example, a first indicator may be associated with PCI1, which is the cell identifier associated with both terrestrial towers 110, 112. When the cell identifier is transmitted from terrestrial tower 110 or 112 to HAP 114, the first indicator may also be transmitted from the terrestrial tower 110 or 112 to HAP 114.

Additionally or alternatively, the indicator may be a bit or flag associated with a unique node identifier for moving nodes, such as a high-altitude balloon. For instance, a second indicator may be associated with HAP 114, which is a moving node of the network. When the unique node identifier for HAP 114 is transmitted from HAP 114 to another node, such as terrestrial tower 110 or 112, the second indicator may also be transmitted from HAP 114 to the other node.

In some other implementations, a database may be used to store mappings, such as in a neighbor relation table, and include the indicators. The database may be local to a node of the network, such as at memory 312 of HAP 114 or a memory of terrestrial tower 110 or 112, or may be stored remotely from the nodes of the network, such as at memory 420 of network controller 400 or other remote storage device. The database may be accessed by the nodes of the network to determine whether an indicator is associated with a particular mapping. In this implementation, a given node, such as HAP 114, may access the database after receiving a cell identifier from another node, such as terrestrial tower 110 or 112. After being accessed by the given node, the indicator may be provided to the given node of the network. Alternatively, rather than directly accessing the database, the given node may send a request for any indicator associated with the received cell identifier, and the indicator may be transmitted from the database to the given node in response to the request.

When the indicator is associated with a given mapping, a node of the network may update the given mapping continually, periodically, or when a change is detected. The detected change may be, for example, a change of location of a node, a change of angle of a communication link, or other type of change. The update may be performed by receiving a communication from a given node of the network including a unique identifier and a cell identifier for the given node. For example, based on the first indicator associated with the cell identifier common to both terrestrial tower 110 and terrestrial tower 112, the HAP 114 may update the mapping of the cell identifier whenever a communication includes the cell identifier. In this way, the mapping of the cell identifier may be updated when the HAP 114 changes from communicating with the terrestrial tower 110 to communicating with the terrestrial tower 112, or vice versa. The update may change the mapping of the cell identifier to a first unique node identifier of terrestrial tower 110 to mapping of the cell identifier to a second unique node identifier of terrestrial tower 112.

In other examples, the update may be performed by accessing a database that tracks unique identifiers and cell identifiers for nodes of the network. For example, at the first point in time when the HAP 114 is located in range of the terrestrial tower 110 and out of range of terrestrial tower 112, a neighbor relation table for HAP 114 in a database may include a mapping of the cell identifier with the first unique node identifier of the terrestrial tower 110. At the second point in time after the first point in time, one or more processors that can modify the database may determine that a location of HAP 114 is in range of terrestrial tower 112 and out of range of terrestrial tower 110. The one or more processors may update the mapping for the cell identifier in the neighbor relation table for HAP 114 in the database to map the cell identifier to the second unique node identifier of the terrestrial tower 112, and not the first unique node identifier of terrestrial tower 110. When the HAP 114 receives the cell identifier and accesses the database at or after the second point in time, the database may provide the updated mapping of the cell identifier to the second unique node identifier of terrestrial tower 112.

In some implementations, the given mapping is additionally or alternatively updated when a number of attempted handovers to a particular node associated with a particular cell identifier has failed. For instance, the HAP 114 may associate PCI1 with unique node identifier ECGI1 of terrestrial tower 110 at the first point in time. At the second point in time, when the HAP 114 is out of range of the terrestrial tower 110 and in range of terrestrial node 112, the HAP 114 may attempt a handover from terrestrial tower 110 to terrestrial tower 112. Because the terrestrial tower 112 has the same cell identifier PCI1 as the terrestrial tower 110, the communication from the HAP 114 to terrestrial tower 112 may at first be based on the association of PCI1 with unique node identifier ECGI1 of terrestrial tower 110. The handover to the terrestrial node 112 may therefore be unsuccessful at first. After a number of unsuccessful handover attempts, the HAP 114 may update the mapping of the cell identifier PCI1 to be associated with unique node identifier ECGI2 of the terrestrial tower 112.

Figure 6:
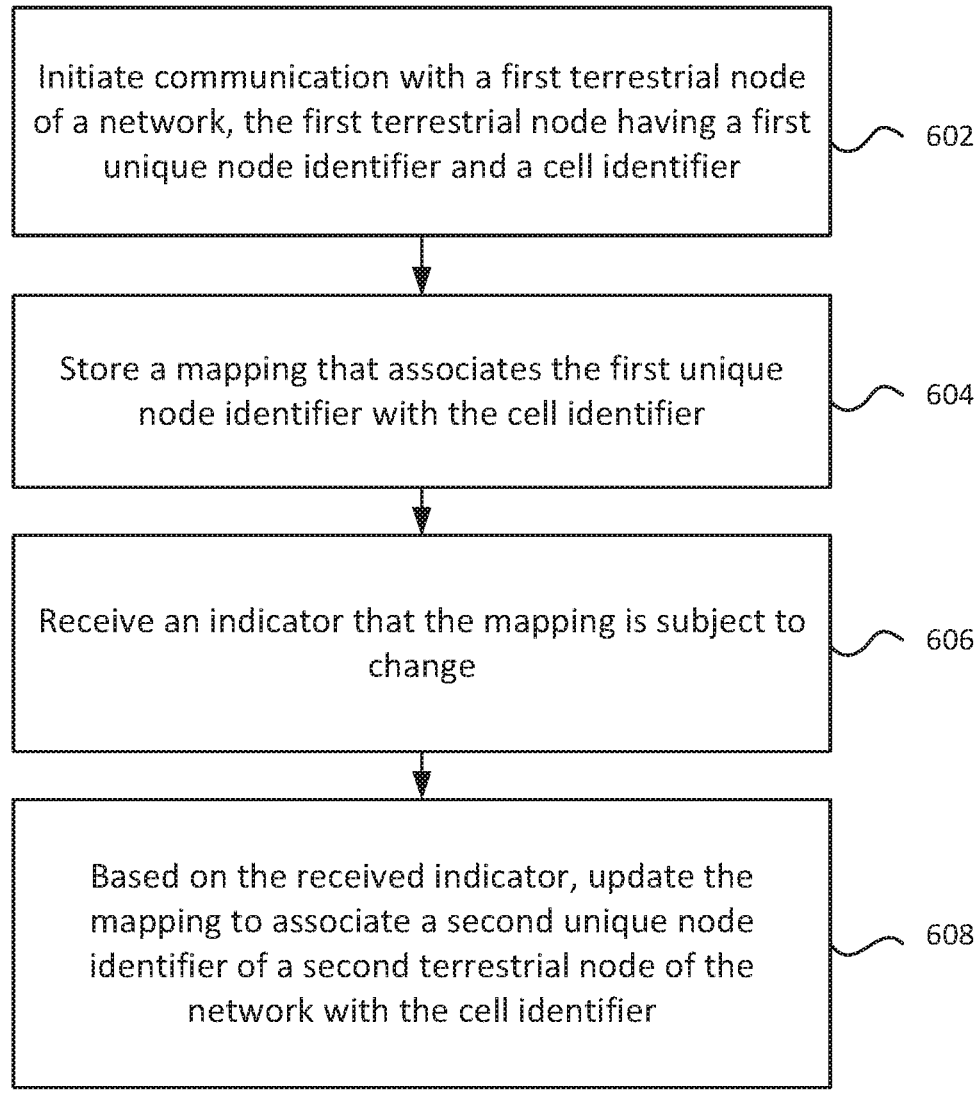
FIG. 6 is a flow diagram of a method in accordance with aspects of the disclosure.

In FIG. 6, flow diagram 600 is shown in accordance with some of the aspects described above that may be performed by one or more processors of nodes of a network, such as one or more processors of nodes 110, 112, 114. While FIG. 6 shows blocks in a particular order, the order may be varied and that multiple operations may be performed simultaneously. Also, operations may be added or omitted.

At block 602, the one or more processors of a given node of the network may initiate communication with a first node of the network. The first node of the network may have a first unique node identifier and a cell identifier. For example, at a first point in time when the HAP 114 is in range of terrestrial tower 110, the one or more processors 310 of HAP 114 may initiate communication with terrestrial tower 110. The terrestrial tower 110 has a first unique node identifier ECGI1 and a cell identifier PCI1.

At block 604, a mapping that associates the first unique node identifier with the cell identifier may be stored at the memory of the given node of the network. For example, a mapping of PCI1 to ECGI1 may be stored at the memory 312 of HAP 114. In some other implementations, the mapping may be stored in a database that is remote from the given node and accessible by the one or more processors of the given node, such as memory 420 of network controller 400 or other type of remote storage device.

At block 606, the one or more processors of the given node may receive or retrieve an indicator that the mapping is subject to change. For example, the indicator may be a flag associated with the first unique identifier, and may be transmitted from the first node when the first node is in motion relative to the given node. As shown in FIG. 5, HAP 114 and terrestrial tower 110 are in motion relative to one another as HAP 114 flies away from terrestrial tower 110 and towards terrestrial tower 112. The one or more processors 310 of HAP 114 may receive an indicator transmitted by one or more processors of the terrestrial tower 110 that indicates the unique node identifier mapped to PCI1 is subject to change since the HAP 114 is in motion relative to terrestrial tower 110.

In another example, the indicator may be a flag associated with the cell identifier, indicating that there are multiple nodes having the flagged cell identifier. The indicator in this example may be retrieved from the remote database after the mapping is stored in the database. In another example the given node may periodically retrieve this mapping from a database for some or all of the cell identifiers. In another example the given node may retrieve this mapping when handovers to a particular node start failing. For example '5' failed handovers indicate an issue with this node. Finally, in some cases, the given node may always retrieve the mapping for all cell identifiers.

At block 608, based on the received or retrieved indicator, the one or more processors of the given node may update the mapping to associate a second unique node identifier with the cell identifier. This update may be performed continuously, at regular intervals, or after a change is detected by the one or more processors. The update may include associating a second unique node identifier of a second node of the network with the cell identifier. For example, at a second point in time when the HAP 114 is in range of terrestrial tower 112, the one or more processors 310 of HAP 114 may initiate communication with terrestrial tower 112. The terrestrial tower 112 has a second unique node identifier ECGI2 and cell identifier PCI1. Because the indicator associated with the unique node identifier ECGI1 indicates that it is subject to change, the one or more processors 310 may update the mapping of PCI1 to ECGI2, discarding or overwriting the mapping of PCI1 to ECGI1. In some examples, based on the indicator, the one or more processors 310 may check the unique node identifier of the node with which it is communicating at regular intervals, such as every 30 minutes or more or less. Checking the unique node identifier may be done by requesting the unique node identifier from the node, reading data transmitted from the node, or retrieving the unique node identifier from a remote storage device.

In some alternatives, the handover protocol may be coordinated at least in part by a central server or network controller in communication with the given node, the first node, and the second node. For example, the one or more processors 410 of network controller 400 may perform one or more of the steps in the blocks described above.

In an alternative implementation, a terrestrial node, such as terrestrial tower 110 or 112, may receive a broadcast of location information of a non-terrestrial node, such as HAP 114. For example, the location information may be carried in a System Information Block (SIB) transmitted by the non-terrestrial node while traveling in a vicinity of the terrestrial node. The location information received at the terrestrial node may indicate that the node transmitting the broadcast is a moving node. The terrestrial node may associate an indicator with the unique node identifier of the non-terrestrial node to indicate that any mapping including this unique node identifier is subject to change. Any mapping including this unique node identifier may be updated continually, periodically, or when a change is detected as described above.

In another implementation, a central server that monitors one or more nodes of the network may send a change indication to a given node that a change is detected to a neighboring node and an update to an associated mapping is required. In response to receiving the change indication, the given node may perform the update as described above.

The features disclosed herein may allow for a more seamless integration of 5G-enabled non-terrestrial nodes with existing terrestrial nodes that provide another type of coverage, such as 4G LTE. The 5G-enabled non-terrestrial nodes may then be used to supplement, expand, or strengthen the coverage of existing networks. For example, the service reliability of a network may be reinforced for M2M or IoT devices or for passengers onboard moving platforms. Multicast and broadcast resources for data may also be provided using the 5G-enabled non-terrestrial nodes, especially towards the network edges or at user terminals. In addition, non-terrestrial nodes, such as high-altitude balloons, may be used to expand network coverage into areas having little to no infrastructure for terrestrial networks. The use of non-terrestrial nodes may reduce the time and cost required to plan and install additional terrestrial nodes, especially in more remote areas.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only

The invention claimed is:

1. A method for performing a handover operation, the method comprising:
   initiating, by one or more processors of a non-terrestrial node, communication with a first terrestrial node of a network at a first point in time, the first terrestrial node having a first unique node identifier and a cell identifier, wherein the non-terrestrial node and the first terrestrial node are configured to connect to client devices;
   storing, in memory by the one or more processors, a mapping of the first unique node identifier associated with the cell identifier;
   receiving, by the one or more processors, an indicator that content of the mapping is subject to change, wherein the mapping is updated after a number of unsuccessful handover attempts by the non-terrestrial node from the first terrestrial node to a second terrestrial node, wherein the cell identifier is common between both the first terrestrial node and the second terrestrial node, wherein the second terrestrial node has a second unique node identifier, wherein the non-terrestrial node is in range of the first terrestrial node at the first point time, and in range of the second terrestrial node at a second point in time after the first point in time, and wherein the second terrestrial node is configured to connect to the client devices; and
   based on the received indicator, the one or more processors updating the content of the mapping stored in the memory with the second unique node identifier of a second terrestrial node of the network associated with the cell identifier.

2. The method of claim 1, wherein:
   the first unique node identifier is a first E-UTRAN cell global identifier (ECGI); the
   second unique node identifier is a second ECGI; and
   the cell identifier is a physical cell identifier (PCI).

3. The method of claim 1, wherein the memory mapping is a local memory of the non-terrestrial node.

4. The method of claim 1, wherein the receiving of the indicator is based on the non-terrestrial node being in motion relative to the first terrestrial node.

5. The method of claim 1, wherein the indicator is a bit or a flag associated with the first unique node identifier.

6. The method of claim 1, wherein the indicator is a bit or a flag associated with the cell identifier.

7. The method of claim 1, wherein the updating the content of the mapping occurs after the one or more processors initiates communication with the second terrestrial node of the network.

8. The method of claim 1, wherein the updating the content of the mapping includes checking a unique node identifier of a node with which the one or more processors are communicating at regular intervals.

9. A system of anon-terrestrial node, the system comprising: a memory; and
   one or more processors coupled to the memory, the one or more processors being configured to:
      initiate communication with a first terrestrial node of a network, the terrestrial node having a first unique node identifier and a cell identifier, wherein the non-terrestrial node and the first terrestrial node are configured to connect to client devices;
      store in the memory a mapping of the first unique node identifier associated with the cell identifier;
      receive an indicator that content of the mapping is subject to change, wherein the mapping is updated after a number of unsuccessful handover attempts by the non-terrestrial node from the first terrestrial node to a second terrestrial node, wherein the cell identifier is common between both the first terrestrial node and the second terrestrial node, wherein the second terrestrial node has a second unique node identifier, wherein the non-terrestrial node is in range of the first terrestrial node at the first point time, and in range of the second terrestrial node at a second point in time after the first point in time, and wherein the second terrestrial node is configured to connect to the client devices; and
      based on the received indicator, update the content of the mapping stored in the memory with the second unique node identifier of a second terrestrial node of the network associated with the cell identifier.

10. The system of claim 9, wherein:
    the first unique node identifier is a first E-UTRAN cell global identifier (ECGI);
    the second unique node identifier is a second ECGI; and
    the cell identifier is a physical cell identifier (PCI).

11. The system of claim 9, wherein the memory is a local memory of the non-terrestrial node.

12. The system of claim 9, wherein the indicator is received based on the non-terrestrial node being in motion relative to the first terrestrial node.

13. The system of claim 9, wherein the indicator is a bit or a flag associated with the first unique node identifier.

14. The system of claim 9, wherein the indicator is a bit or a flag associated with the cell identifier.

15. The system of claim 9, wherein the content of the mapping is updated according to a communication with the second terrestrial node of the network.

16. The system of claim 9, wherein the content of the mapping is updated based on a check of a unique node identifier of a node with which the one or more processors are communicating performed at regular intervals.

17. A non-transitory, computer-readable medium including instructions that, when executed by one or more processors of a non-terrestrial node of a network, cause the one or more processors to perform a method, the method comprising:
    initiating communication with a first terrestrial node of a network, the terrestrial node having a first unique node identifier and a cell identifier, wherein the non-terrestrial node and the first terrestrial node are configured to connect to client devices;
    storing in memory a mapping of the first unique node identifier associated with the cell identifier;
    receiving an indicator that content of the mapping is subject to change, wherein the mapping is updated after a number of unsuccessful handover attempts by the non-terrestrial node from the first terrestrial node to a second terrestrial node, wherein the cell identifier is common between both the first terrestrial node and the second terrestrial node, wherein the second terrestrial node has a second unique node identifier, wherein the non-terrestrial node is in range of the first terrestrial node at the first point time, and in range of the second terrestrial node at a second point in time after the first point in time, and wherein the second terrestrial node is configured to connect to the client devices; and
    based on the received indicator, updating the content of the mapping stored in the memory with the second unique node identifier of a second terrestrial node of the network associated with the cell identifier.

18. The non-transitory, computer-readable medium of claim 17, wherein:
the first unique node identifier is a first E-UTRAN cell global identifier (ECGI);
the second unique node identifier is a second ECGI; and
the cell identifier is a physical cell identifier (PCI).

19. The non-transitory, computer-readable medium of claim 17, wherein the indicator is a bit or a flag associated with the first unique node identifier.

20. The non-transitory, computer-readable medium of claim 17, wherein the indicator is a bit or a flag associated with the cell identifier.

* * * * *